United States Patent
Bonazzi et al.

(10) Patent No.: US 9,599,465 B2
(45) Date of Patent: Mar. 21, 2017

(54) LIGHT-EMITTING DEVICE FOR DETECTING PASSAGE OR SMOKE AND METHOD FOR MANUFACTURING SUCH A DEVICE

(71) Applicant: FINSECUR, Nanterre (FR)

(72) Inventors: Christophe Bonazzi, Nanterre (FR); Andrew Gilmour, Dunstable (GB)

(73) Assignee: FINSECUR, Nanterre (FR)

( * ) Notice: Subject to any disclaimer, the term of this patent is extended or adjusted under 35 U.S.C. 154(b) by 0 days.

(21) Appl. No.: 14/758,558

(22) PCT Filed: Dec. 30, 2013

(86) PCT No.: PCT/FR2013/053284
§ 371 (c)(1),
(2) Date: Jun. 29, 2015

(87) PCT Pub. No.: WO2014/102519
PCT Pub. Date: Jul. 3, 2014

(65) Prior Publication Data
US 2015/0362313 A1    Dec. 17, 2015

(30) Foreign Application Priority Data
Dec. 28, 2012    (FR) ..................................... 12 62905

(51) Int. Cl.
| | |
|---|---|
| G08B 17/103 | (2006.01) |
| G01B 11/27 | (2006.01) |
| G08B 13/183 | (2006.01) |
| G02B 27/62 | (2006.01) |
| G08B 13/22 | (2006.01) |
| G08B 17/113 | (2006.01) |

(52) U.S. Cl.
CPC .............. *G01B 11/27* (2013.01); *G02B 27/62* (2013.01); *G08B 13/183* (2013.01); *G08B 13/22* (2013.01); *G08B 17/103* (2013.01); *G08B 17/113* (2013.01); *Y10T 29/49107* (2015.01)

(58) Field of Classification Search
CPC ... H01B 17/113; H01B 17/103; H01B 17/107
USPC ................................................ 340/628, 630
See application file for complete search history.

(56) References Cited

U.S. PATENT DOCUMENTS

| | | |
|---|---|---|
| 5,260,765 A | 11/1993 | Hawkinson |
| 5,302,942 A | 4/1994 | Blau |
| 7,250,871 B2 * | 7/2007 | Williams ............... G01N 15/06 340/627 |
| 2003/0116697 A1 | 6/2003 | Kuhar |

(Continued)

FOREIGN PATENT DOCUMENTS

EP     0 005 853 A1    12/1979

*Primary Examiner* — Kevin Kim
(74) *Attorney, Agent, or Firm* — Im IP Law; C. Andrew Im

(57) ABSTRACT

A light-emitting device to detect passage or smoke in the emitted beam. The device includes a source of invisible radiation, a source of visible laser radiation, an alignment component to align the central axis of the visible radiation with an axis parallel to the central axis of the invisible radiation, and a switch to turn off the visible laser source. The device can further include a housing containing both sources of radiation. The switch is configured to be controlled by the closing of the housing and the source of visible laser radiation is turned off in response to the closure of the housing.

11 Claims, 5 Drawing Sheets

(56) References Cited

U.S. PATENT DOCUMENTS

| | | |
|---|---|---|
| 2005/0007578 A1 | 1/2005 | Ziemins et al. |
| 2006/0291531 A1* | 12/2006 | Hollander ............ G01J 5/0044 374/121 |
| 2008/0265144 A1 | 10/2008 | Shaked et al. |
| 2008/0316039 A1* | 12/2008 | White ................. G08B 17/103 340/630 |

* cited by examiner

LIGHT-EMITTING DEVICE FOR DETECTING PASSAGE OR SMOKE AND METHOD FOR MANUFACTURING SUCH A DEVICE

RELATED APPLICATIONS

This application is a §371 application from PCT/FR2013/053284 filed Dec. 30, 2013, which claims priority from French Patent Application No. 12 62905 filed Dec. 28, 2012, each of which is herein incorporated by reference in its entirety.

TECHNICAL FIELD OF THE INVENTION

The present invention relates to a light-emitting device for detecting passage or smoke, a method for manufacturing such a device and a passage and smoke detection device comprising same. It applies, in particular, to fire and/or intrusion detection and/or to the surveillance of premises or sites.

STATE OF THE ART

Fire detection is realized in many different ways, at least one of which is optical. In this case, a light signal is emitted in the premises, preferably infrared for smoke detection, the light radiation emitted is received after it has passed through a portion of the atmosphere in the premises, and the presence of smoke is detected when the amount of light received is below a limit value. The greater the distance traversed by the light ray, the faster the smoke detection. However, the orientation tolerances of the light emitting components are large and inserting these detectors in housings adds an additional dispersion. Thus, it is difficult to correctly position the light sensor facing the light emitter or, in the case where a single housing comprises the emitter and the sensor, to position a retro-reflector in the emitted light beam. Consequently, either the distance traversed is reduced or the installation takes a long time.

Preventing the risk of a third-party intrusion or fire in premises or sites is a significant constraint for the security of the property and persons present inside said sites and premises. The known detection systems use either cameras or sensors of light rays emitted by light sources. The cameras and image processing required to detect the passage of an intruder are complex, expensive and not very reliable, because they are sensitive to the movement of shadows, e.g. of trees set in movement by the wind or birds. In addition, the light rays to be used must be invisible to prevent intruders from seeing them and therefore from bypassing them or, in the case of fire detection, to be as nonintrusive as possible. However, aiming an invisible ray at a target turns out to be a very delicate operation, increasing the installation time of such systems.

OBJECT AND SUMMARY OF THE INVENTION

The present invention aims to remedy all or part of these drawbacks.

To this end, according to a first aspect, the present invention envisages a light-emitting device for detecting passages through the emitted beam, that comprises:
- a source of visible laser radiation;
- a means for aligning the central axis of the visible radiation with a reference axis parallel to the central axis of the invisible radiation; and
- a switch to switch the visible laser source off.

Thanks to these provisions, while a passage detection system is being installed, the light-emitting device is installed by lighting the source of visible laser radiation. Aiming the laser at a target, e.g. a light sensor or a retro-reflector, is therefore easy, since the operator can see the visible laser radiation.

In some embodiments, the source of visible laser radiation emits a light with a wavelength of between 497 and 560 nm. These provisions make the laser radiation particularly visible.

In some embodiments, the device that is the subject of the present invention comprises a means of controlling a cyclical lighting of the visible laser source downstream from the switch.

Thanks to these provisions, the visible laser ray is all the more visible, since the operator's eyes see changes in luminosity better than constant light. In addition, the electrical consumption of the device is decreased because, during the installation, the source of visible laser radiation is only lit for a portion of the lighting cycle.

In some embodiments, the device that is the subject of the present invention comprises a housing that contains the two radiation sources and a switch, the switch for switching off the visible laser source being controlled by the switch of the housing, configured to control the activation of the visible laser source when the housing is opened and instructing the source of visible laser radiation to be switched off when the housing is closed.

Thanks to these provisions, during installation, the housing is open and aiming the radiations at the targets is performed with the aiming means contained in the housing. In contrast, when the aiming has been performed, the housing is closed, which has the effect of switching off the source of visible laser radiation and of protecting the aiming means from any handling.

In some embodiments, the source of visible laser radiation has an outer cylindrical or conical surface of revolution and a predefined angular tolerance, and the alignment means comprises:
- an outer part having an inner cylindrical or conical hole of revolution, the axis of the hole being offset in relation to the reference axis, by a first angle at least equal to half the predefined angular tolerance; and
- an intermediate part having an outer cylindrical or conical surface of revolution matching a portion of the inner hole of the outer part and an inner cylindrical or conical hole of revolution matching a portion of the outer surface of the source of visible laser radiation, the axis of the outer surface and the axis of the inner hole of the intermediate part forming an angle between them equal to the first angle.

Thanks to these provisions, once both laser radiation sources have been installed on a flat mounting, in-factory, their optical axes are adjusted to be parallel by turning the intermediate part and the source of visible laser radiation, causing the orientation of the optical axis of the source of visible laser radiation to vary in a continual and regular manner.

In some embodiments, the source of invisible radiation has an outer cylindrical or conical surface of revolution and a predefined angular tolerance, and the alignment means comprises:
- an outer part having an inner cylindrical or conical hole of revolution, the axis of the hole being offset in relation to the reference axis, by a first angle at least equal to half the predefined angular tolerance; and an intermediate part having an outer cylindrical or conical surface of revolution matching a portion of the inner hole of the outer part and an inner cylindrical or conical hole of revolution matching a portion of the outer surface of the source of invisible radiation, the axis of the outer surface and the axis of the inner hole of the intermediate part forming an angle between them equal to the first angle.

Thanks to these provisions, once both laser radiation sources have been installed on a flat mounting, in-factory, their optical axes are adjusted to be parallel by turning the intermediate part and the source of invisible radiation, causing the orientation of the optical axis of the source of visible laser radiation to vary in a continual and regular manner.

In some embodiments, the mount of the source of visible laser radiation comprises at least one outer part comprising a cylindrical recess and an inner part, whose outer surface matches the recess of the outer part, having a cylindrical recess with a circular base matching the outer surface of the source of visible laser radiation, the axes of the inner and outer cylindrical surfaces of the inner part forming an angle between them greater than one angular degree and less than ten angular degrees.

Thanks to these features, by causing the inner cylinder to turn inside the outer cylinder and the source of visible laser radiation inside the inner cylinder, any difference between the mechanical and optical axes of the source of visible radiation can be compensated, within a solid angle. Thus sources of visible radiation with large manufacturing tolerances and, therefore, low cost prices can be used.

According to a second aspect, the present invention envisages an alarm device that comprises a light-emitting device that is the subject of the present invention, a means of receiving the light emitted by said light-emitting device, and a means of generating alarms configured so as to emit an alarm signal when the light reception means receives a light intensity lower than a predefined limit value.

According to a second aspect, the present invention envisages smoke detection device that comprises a light-emitting device that is the subject of the present invention, a means of receiving the light emitted by said light-emitting device, and a means of generating a signal representative of the detection of smoke configured so as to emit a smoke detection signal when the light reception means receives a light intensity lower than a predefined limit value.

According to a third aspect, the present invention envisages an intrusion detection device that comprises a light-emitting device that is the subject of the present invention, a means of receiving the light emitted by said light-emitting device, and a means of generating a signal representative of the detection of intrusions configured so as to emit an intrusion detection signal when the light reception means receives a light intensity lower than a predefined limit value.

According to a fourth aspect, the present invention envisages a manufacturing method for a light-emitting device that is the subject of the present invention, that comprises:
   a step of installing the source of invisible radiation on a flat mounting;
   a step of installing the source of visible laser radiation on the flat mounting; and
   a step of aligning the optical axes of the laser radiation sources to be parallel.

In some embodiments, during the step of parallel alignment, the following are carried out:
   a step of rotation, in an outer part comprising a cylindrical recess, of an inner part, whose outer surface matches the recess of the outer part, having a cylindrical recess with a circular base matching the outer surface of the source of visible laser radiation, the axes of the inner and outer cylindrical surfaces of the inner part forming an angle between them greater than one angular degree and less than ten angular degrees and
   a step of rotating the source of visible laser radiation within the inner part.

In some embodiments, the source of visible laser radiation having an outer cylindrical or conical surface of revolution and a predefined angular tolerance, during the step of parallel alignment, the following are carried out:
   a step of rotation of an intermediate part within an outer part,
      the outer part having an inner cylindrical or conical hole of revolution, the axis of the hole being offset in relation to the reference axis, by a first angle at least equal to half the predefined angular tolerance and
      the intermediate part having an outer cylindrical or conical surface of revolution matching a portion of the inner hole of the outer part; and
   a rotation of the source of visible laser radiation within the intermediate part,
      the intermediate part having an inner cylindrical or conical hole of revolution matching a portion of the outer surface of the source of visible laser radiation, the axis of the outer surface and the axis of the inner hole of the intermediate part forming an angle between them equal to the first angle.

In some embodiments, the source of invisible radiation having an outer cylindrical or conical surface of revolution and a predefined angular tolerance, during the step of parallel alignment, the following are carried out:
   a step of rotation of an intermediate part within an outer part,
      the outer part having an inner cylindrical or conical hole of revolution, the axis of the hole being offset in relation to the reference axis, by a first angle at least equal to half the predefined angular tolerance and
      the intermediate part having an outer cylindrical or conical surface of revolution matching a portion of the inner hole of the outer part; and
   a rotation of the source of invisible radiation within the intermediate part,
   the intermediate part having an inner cylindrical or conical hole of revolution matching a portion of the outer surface of the source of invisible radiation, the axis of the outer surface and the axis of the inner hole of the intermediate part forming an angle between them equal to the first angle.

As the particular characteristics, advantages and aims of these detection devices and of this method are similar to those of the light-emitting device that is the subject of the present invention, they are not repeated here.

Another problem that is solved by some embodiments of the present invention is that of the alignment of an axis of a mechanical part parallel to a predefined axis, when said axis of the mechanical part has an angular tolerance.

For example, the mechanical part is a light source, whose optical axis, which has an angular tolerance in relation to the mechanical axis, must be aligned parallel to an optical axis.

To remedy this parallel alignment difficulty, the present invention envisages, according to a fifth aspect, a device for aligning parallel to a reference axis a part having an outer cylindrical or conical surface of revolution and a predefined angular tolerance, that comprises:
   an outer part having an inner cylindrical or conical hole of revolution, the axis of the hole being offset in relation to the reference axis, by a first angle at least equal to half the predefined angular tolerance; and an intermediate part having an outer cylindrical or conical surface of revolution matching a portion of the inner hole of the outer part and an inner cylindrical or conical hole of revolution matching a portion of the outer surface of the part whose axis is to be aligned, the axis of the outer surface and the axis of the inner hole of the intermediate part forming an angle between them equal to the first angle, the part whose axis is to be aligned sliding in rotation in the inner hole of the intermediate part.

It should be noted that two "matching" surfaces means two surfaces identical to within mechanical play, which allows the rotation of one surface within another.

Thanks to these provisions, by performing a rotation of the intermediate part within the outer part and a rotation of the part whose axis is to be aligned within the intermediate part, any angle, below the angular tolerance, of the axis to be aligned to the mechanical axis of the part can be compensated.

In some embodiments, the first angle is at least equal to the sum of half the predefined angular tolerance and the mechanical positioning angular tolerance of the axis of the outer part.

Thanks to these provisions, even if the outer part has an axis offset, within the positioning tolerance limit, in relation to its nominal position, the alignment can be realized.

BRIEF DESCRIPTION OF THE FIGURES

Other advantages, aims and characteristics of the present invention will become apparent from the description that will follow, made, as an example that is in no way limiting, with reference to the drawings included in an appendix, wherein.

DETAILED DESCRIPTION OF THE EMBODIMENTS

Note that the figures are not to scale.

Figure 1:
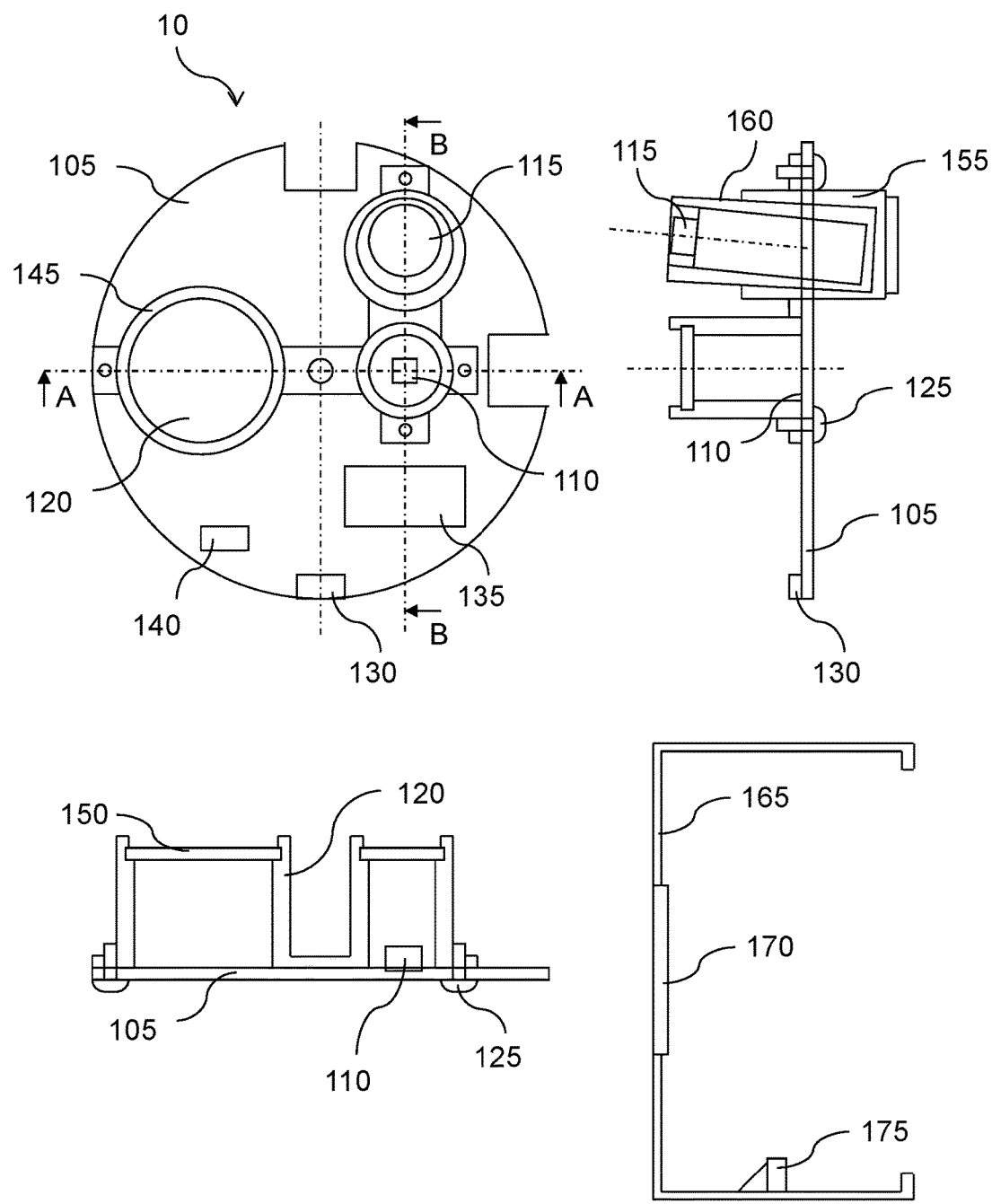
FIG. 1 represents, in four cross-section views, elements of a particular embodiment of the light-emitting device that is the subject of the present invention.

FIG. 1 shows a particular embodiment of a light-emitting device 10 that is the subject of the present invention, excluding the housing, in a front view at top left, in a cross-section along axis A-A, at bottom-left, and in cross-section along axis B-B at right, and, for a housing, at bottom-right.

This device 10 comprises:
a source 110 of invisible radiation;
a source 115 of visible laser radiation;
a means 155 and 160 for aligning the central axis of the visible radiation with a reference axis parallel to the central axis of the invisible radiation; and a switch 140 to switch the visible laser source 115 off.

In this device 10, a flat mounting 105 holds the invisible light source 110, the visible laser light source 115 and a photoreceptor 120. Each of these photo-electronic components is surrounded by a cylinder 145 for protection against parasite light. The protection cylinders are made of a black plastic mechanical part fastened onto the flat mounting 105 with screws 125.

The photoreceptor 120 has a chromatic filter 150 mounted on it, which is configured to let a narrow range of wavelengths around the emission wavelength of the source of invisible laser light 110 pass through.

The source of invisible light 110 is, for example, an infrared diode that emits within the infrared wavelength spectrum. The source of visible laser light 115 emits, preferably, a green light beam, a color to which the human eye is particularly sensitive. It is recalled here that primary green is visible within a wavelength range of approximately 497-560 nm. The sensitivity of a human eye accustomed to darkness is greater for a wavelength of approximately 507 nm, i.e. blueish-green, whereas an eye accustomed to light is more sensitive to a wavelength of 550-555 nm, i.e. yellowy-green.

The photoreceptor 120 is, for example, a phototransistor. In some variants, the source of invisible light 110 is an infrared laser diode.

A switch 140 allows the source of visible laser light 115 to be switched on. A cyclical means of control 135 is positioned between the switch 140 and the source of invisible light 115. When the housing of the device 10 is open and the switch 140 is closed, the source of visible laser light 115 consequently emits a visible light beam cyclically. For example, the duration of the cycle is one second and the duration of the light emission is one half-second.

A switch 130, controlled by closing the housing, causes the light emission to switch between the source of visible laser light 115, when the housing is open, and the source of visible laser light 110, when the housing is closed.

To make the light rays coming from the two light sources 110 and 115 parallel, the device 10 comprises means of adjusting the orientation of the optical axis of the light source 115. In the embodiment shown in FIG. 1, the source of invisible light 110 is a surface-mounted device ("SMD"). Its orientation is therefore fixed in relation to the flat mounting 105. In contrast, the source of visible light 115 is a low-cost component shaped as a cylinder with a circular base.

The means for parallel alignment of the optical axes of the radiation sources 110 and 115 comprises, in the embodiment shown in FIG. 1, forming a base for the source of visible radiation 115:

an outer part 155 comprising a cylindrical recess and an inner part 160, whose outer surface matches the recess of the outer part, having a cylindrical recess with a circular base matching the outer surface of the source of visible laser radiation, the axes of the inner and outer cylindrical surfaces of the inner part forming an angle between them preferably greater than one angular degree and less than ten angular degrees, preferably less than five angular degrees.

The alignment means is described with reference to FIGS. 4-9.

In this way, by firstly making the inner part 160 turn within the cylindrical recess of the outer part 155 and, secondly, the source of visible laser radiation 115 turn in the inner recess of the inner part 160, the optical axis of the source of visible laser radiation 115 is oriented to any direction of a solid angle.

In this way, the difference between the mechanical and optical axes of the source of visible radiation 115 is compensated. Thus sources of visible radiation with large manufacturing tolerances, e.g. of three angular degrees, and, therefore, low cost prices can be used.

Each device 10 is coupled to a reflector, e.g. a retro-reflector, positioned at one extremity of an optical path that corresponds to the optical axis of the source of invisible light 110. The reflected light is partially captured by the photoreceptor 120. The output signal of the photoreceptor 120 is processed by an electronic circuit (not shown but preferably coinciding with the flat mounting 105) that compares it to a predefined limit value. The limit value is either fixed or adaptive, i.e. slowly variable according to the output signal of the photoreceptor 120. When the signal coming from the photoreceptor 120 corresponds to a reflected light intensity lower than a limit value, the electronic circuit triggers a signal representing the passage of an object, a person or an animal in the optical path that goes from the light source 110 to the reflective surface.

FIG. 1 shows, at bottom right, a cross-section of a housing cover 165, comprising a window 170, transparent to the wavelengths perceived by the photoreceptor 120.

This housing 165 also comprises a pusher 175, configured to operate the switch 130 when the housing on the flat mounting 105 is closed, so that the source of visible light 115 can no longer emit light and the source of invisible light 110 can emit light. Conversely, as soon as the housing 165 is open, the switch 130 is released and the source of visible light 115 can emit light and the source of invisible light 110 can no longer emit light. Of course, during the manufacturing and adjustment phase of the device, both sources of light can emit simultaneously, under the control of a program dedicated to this phase.

Figure 2:
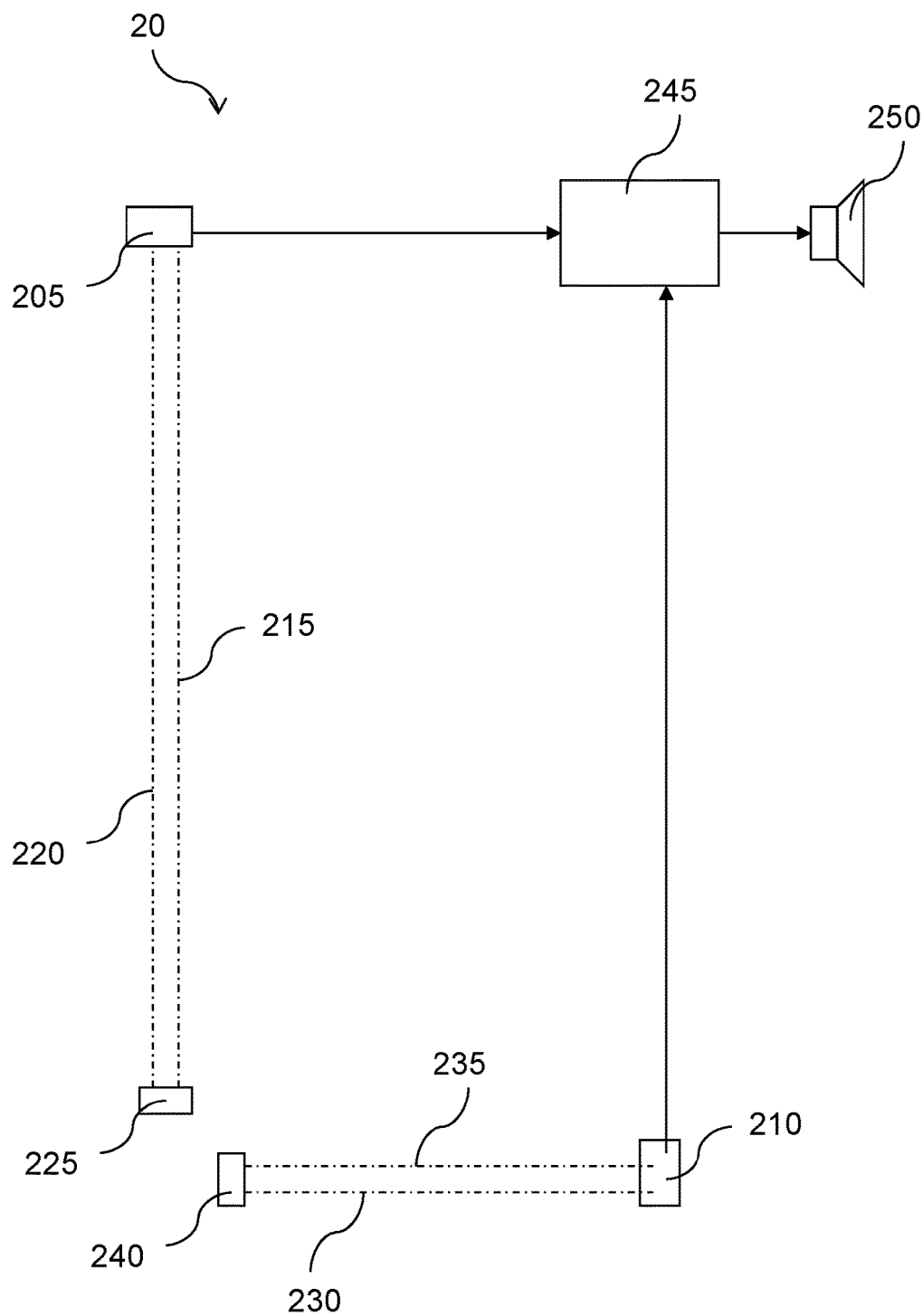
FIG. 2 represents an installation diagram of an alarm device that is the subject of the present invention.

As can be seen in FIG. 2, to monitor a site by detecting intrusions, an alarm device 20 is installed, which comprises at least one light-emitting device that is the subject of the present invention. In FIG. 2, two light-emitting devices 205 and 210 are used. Firstly, the light-emitting device 205 emits a visible light ray 215 that is reflected on a retro-reflector 225. The positioning of the device 205 and/or of the retro-reflector 225 is assisted by the fact that the light emitted by the source 115 is visible and by the fact that this light emission is intermittent. Once the positions of the device 205 and the retro-reflector 225 have been fixed, the housing of the device 205 is closed, which has the effect of switching off the source 115. While it is in operation, the device 205 emits an invisible ray 220 that is also reflected on the retro-reflector 225.

In the same way, the device 210 emits in succession a visible light ray 230 then an invisible light ray 235 in the direction of a retro-reflector 240. After being compared to a predefined limit value, the signal coming from the photoreceptors 120 of the devices 205 and 210 are transmitted to an alarm control unit 245. The alarm control unit 245 follows the commands of a program to trigger actions, following the detection of a passage in the light beams 220 and 235. For example, the alarm control unit 245 makes telephone calls and/or triggers a sound alarm by causing a loudspeaker 250 to emit a sound signal.

In some embodiments, the device 20 is incorporated into a smoke- or fire-detection device, which also comprises a means of generating a signal representative of the detection of smoke configured so as to emit a smoke detection signal when the light reception means receives a light intensity lower than a predefined limit value.

In some embodiments, the device 20 is incorporated into an intrusion detection device, which also comprises a means of generating a signal representative of the detection of an intrusion configured so as to emit an intrusion detection signal when the light reception means receives a light intensity lower than a predefined limit value.

Figure 3:
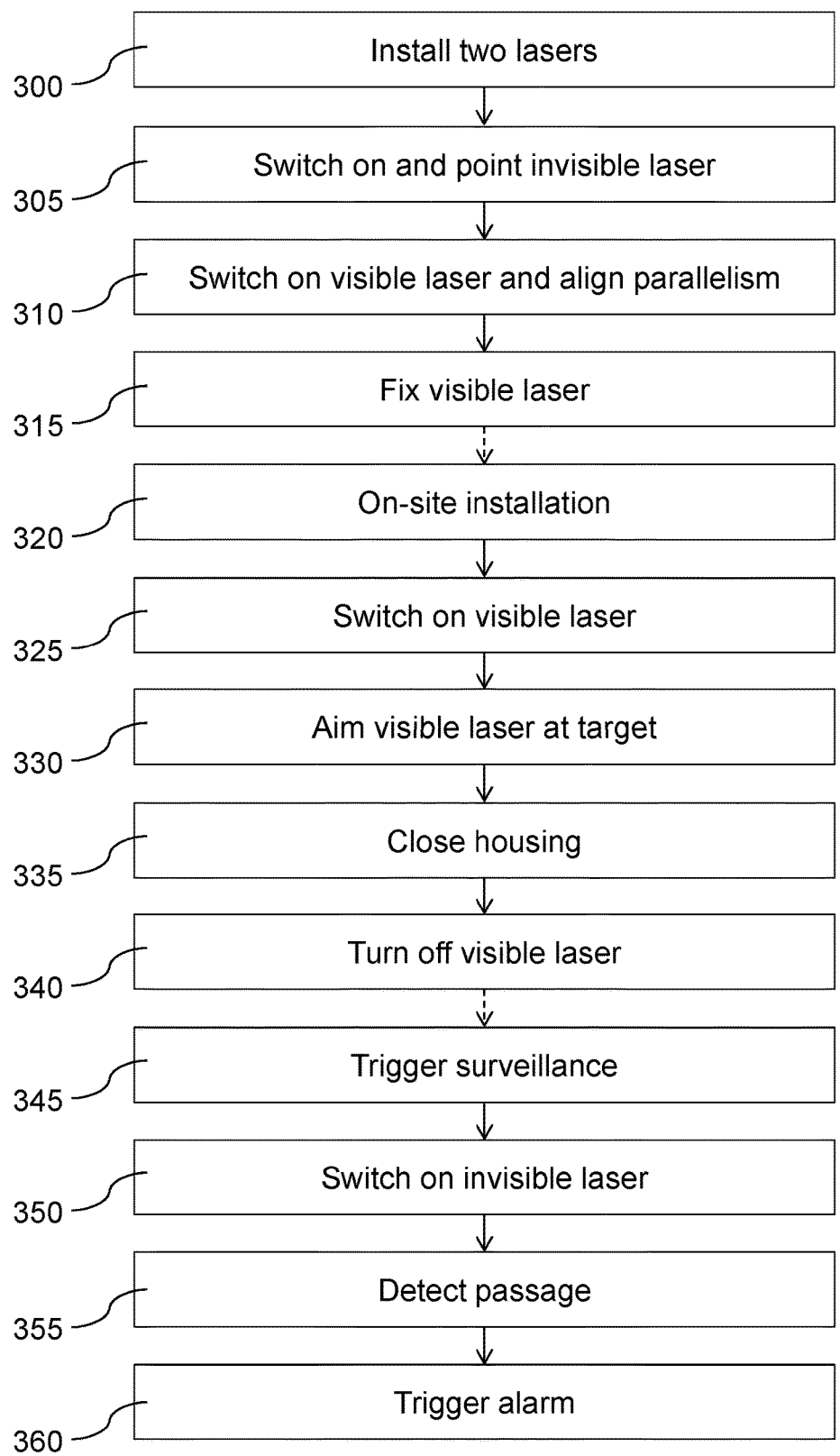
FIG. 3 represents, in the form of a logical diagram, steps utilized in a particular embodiment of the method that is the subject of the present invention.

As can be seen in FIG. 3, manufacturing a light-emitting device that is the subject of the present invention comprises:
  a step 300 of installing the source of invisible radiation 115 and the source of visible laser radiation 110 onto a flat mounting and
  a step 305 to 315 of aligning the parallelism of the axes of the laser radiation sources 110 and 115.

During the step 305, the source of invisible radiation 110 is switched on and it is checked that the direction of the optical axis of the source of invisible laser radiation 110 is perpendicular to the flat mounting 105. If it is not, the orientation of the flat mounting 105 is changed until the optical axis of the source of invisible radiation 110 corresponds to a predefined optical axis. For example, a measurement is made of the radiation reflected onto the photoreceptor 120 for a first retro-reflector, which is positioned in the vicinity of the flat mounting 105; then, once the orientation has been adjusted, on a second more distant retro-reflector and so on.

It should be noted that, for certain laser diodes, the optical axis is normalized as perpendicular to the plane of the surface-mounted circuit ("SMC") and step 305 is redundant.

During the step 310, the source of visible laser radiation 115 is switched on and the parallelism of the optical radiation sources 110 and 115 is adjusted by carrying out the following:
  a step of rotation, in an outer part comprising a cylindrical recess, of an inner part, whose outer surface matches the recess of the outer part, having a cylindrical recess with a circular base matching the outer surface of the source of visible laser radiation, the axes of the inner and outer cylindrical surfaces of the inner part forming an angle between them greater than one angular degree and less than ten angular degrees and
  a step of rotating the source of visible laser radiation within the inner part.

During the step 315, the location of the source of visible laser radiation 115 is fixed, e.g. by welding or bonding. During a step 320, the light-emitting device 10 is installed on the site to be monitored without placing the housing's cover over the flat mounting 105. During a step 325, the source of visible laser radiation 115 is switched on.

During a step 330, the relative positioning of the device 10 and the retro-reflector, which is to reflect its invisible radiation, is realized. To achieve this, either the device 10 is held in place and the retro-reflector is positioned at the place specified by the visible laser radiation, or the retro-reflector is fixed beforehand, then the device 10 is moved or its orientation is modified. The change in the orientation of the device 10 is performed by utilizing adjustment screws configured to allow an adjustment of the angle, causing the alignment of the source 115 of visible laser radiation.

During a step 335, the housing of the device 10 is closed by positioning the cover. During a step 340, closing the housing of the device 10 causes the source of visible laser radiation 115 to be switched off.

During a step 345, the site surveillance is triggered. This surveillance is triggered by the alarm control unit 245. During a step 350, the source of invisible radiation 110 is switched on. During a step 355, the passage of an object, an animal, a person or a darkening due to smoke within the ray emitted by the source of invisible laser radiation is detected by processing the signal coming from the photoreceptor 120. During a step 360, if a passage is detected, the alarm control unit triggers actions according to the program that makes it work.

Figure 4:
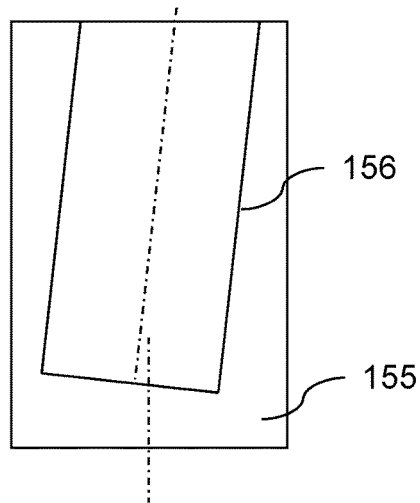
FIGS. 4 to 6 represent respectively two parts of a means for aligning optical axes and a source of visible laser radiation.

As illustrated in FIG. 4, the outer part 155 of the means for parallel alignment of the optical axes of the sources of radiation 110 and 115 has an inner cylindrical or conical hole of revolution 156. In FIG. 4, this hole 156 is a tapered cylinder of revolution.

The axis of the hole 156 is offset in relation to the reference axis by a first angle at least equal to half the predefined angular tolerance of the source 115 of visible laser radiation.

Preferably, the first angle is at least equal to the sum of half the predefined angular tolerance and the mechanical positioning angular tolerance of the axis of the outer part 155 and of the mechanical positioning angular tolerance of the axis of the source of invisible radiation 110.

Figure 5:
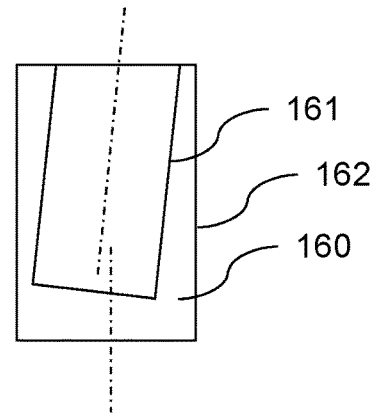

As illustrated in FIG. 5, the intermediate part 160 of the alignment means has:
- an outer cylindrical or conical surface of revolution 162 matching a portion of the inner hole 156 of the outer part 155; and
- an inner cylindrical or conical hole of revolution 161 (cylindrical in FIG. 5) matching a portion of the outer surface 118 of the source 115 of visible laser radiation, the axis of the outer surface 161 and the axis of the inner hole 162 of the intermediate part 160 forming an angle between them preferably equal to the first angle.

Figure 6:
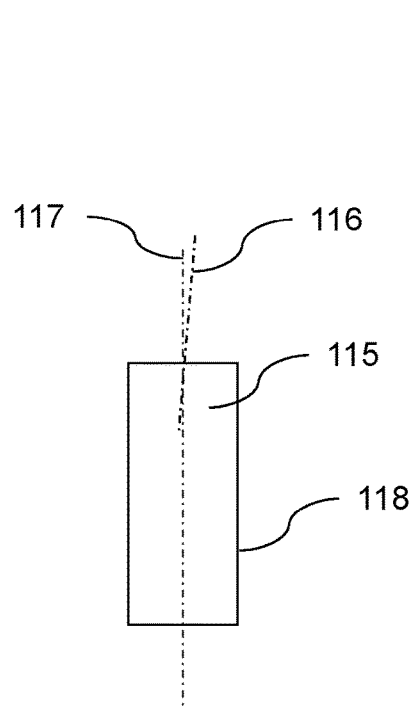

As illustrated in FIG. 6, the source 115 of visible laser radiation has an outer cylindrical or conical surface of revolution 118 (cylindrical in FIG. 6) and a predefined angular tolerance between its mechanical axis 117 (the axis of revolution of the outer surface 118) and its optical axis 116, i.e. the axis along which the laser radiation travels. It should be noted that, if the source 115 of visible laser radiation does not have an outer cylindrical or conical surface of revolution, the source 115 is fixed to a part having these missing geometric characteristics.

Figure 7:
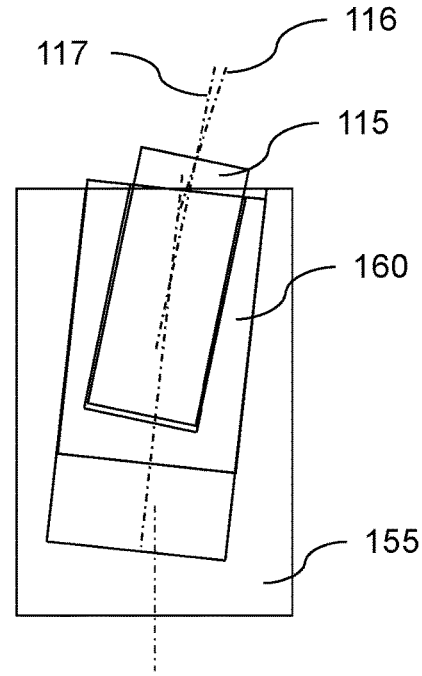
FIGS. 7 to 9 represent respective successive positioning of the parts illustrated in FIGS. 4 to 6 and of the source of visible laser radiation.
Figure 8:
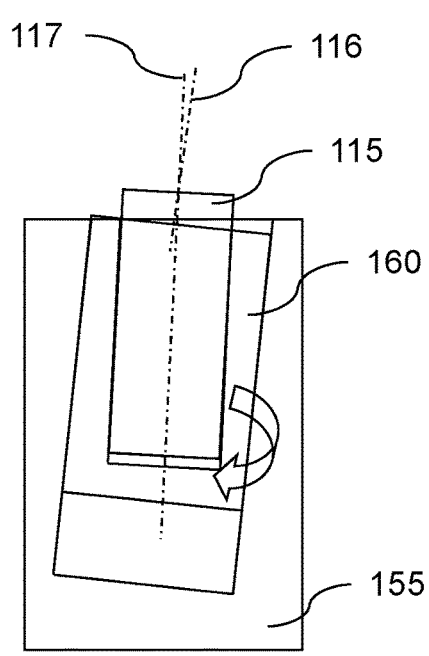
Figure 9:
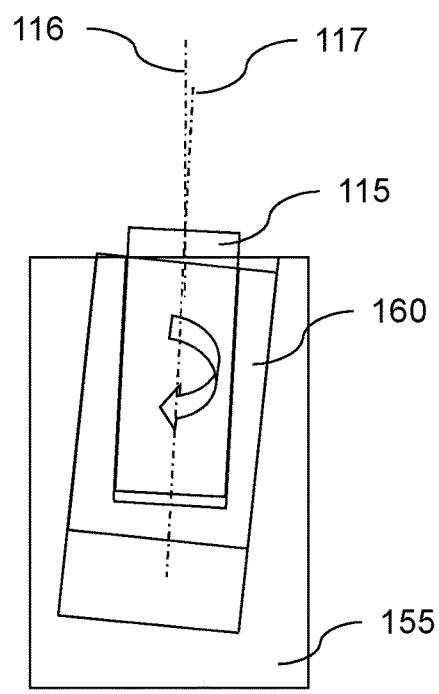

To align the optical axis of the radiation source 115 and the axis of the source of invisible radiation 110 to be parallel, starting from the configuration illustrated in FIG. 7, during step 310, the following are made to turn simultaneously or successively:
- the intermediate part 160 within the outer part 155 as illustrated in FIG. 8, and
- the source of visible laser light 115 within the intermediate part 160, as illustrated in FIG. 9.

It should be noted that the means of alignment shown with reference to FIGS. 4 to 9 are applied, in variants, to the source 110 of invisible radiation or to each of the two sources of radiation 110 and 115.

More generally, the characteristics of the alignment means illustrated in FIGS. 4 to 9 make it possible to obtain the alignment of an axis of a mechanical part parallel to a predefined axis, when said axis of the mechanical part has an angular tolerance.

In the above example, the mechanical part is a light source, whose optical axis, which has an angular tolerance in relation to the mechanical axis, must be aligned parallel to a reference optical axis, i.e. the optical axis of the source of invisible radiation.

More generally, to remedy the difficulty of parallel alignment of two axes, the present invention envisages, according to a fifth aspect, a device for aligning parallel to a reference axis a part having an outer cylindrical or conical surface of revolution and a predefined angular tolerance, which comprises:
- an outer part having an inner cylindrical or conical hole of revolution, the axis of the hole being offset in relation to the reference axis, by a first angle at least equal to half the predefined angular tolerance; and
- an intermediate part having an outer cylindrical or conical surface of revolution matching a portion of the inner hole of the outer part, and an inner cylindrical or conical hole of revolution matching a portion of the outer surface of the part whose axis is to be aligned, the axis of the outer surface and the axis of the inner hole of the intermediate part forming an angle between them equal to the first angle, the part whose axis is to be aligned sliding in rotation in the inner hole of the intermediate part.

It should be noted that two "matching" surfaces means two surfaces identical to within mechanical play, which allows the rotation of one surface within another.

Thanks to these provisions, by performing a rotation of the intermediate part within the outer part and a rotation of the part whose axis is to be aligned within the intermediate part, any angle, below the angular tolerance, of the axis to be aligned to the mechanical axis of the part can be compensated.

In some embodiments, the first angle is at least equal to the sum of half the predefined angular tolerance and the mechanical positioning angular tolerance of the axis of the outer part.

Thanks to these provisions, even if the outer part has an axis offset, within the positioning tolerance limit, in relation to its nominal position, the alignment can be realized.

The invention claimed is:

1. Light-emitting device for detecting passage or smoke in the emitted beam, comprising:
- a source of invisible radiation;
- a source of visible laser radiation;
- an alignment component to align a central axis of the visible laser radiation with a reference axis parallel to a central axis of the invisible radiation;
- a switch to turn off the source of the visible laser radiation; and
- a housing to house the two radiation sources and the switch configured to control an activation of the source of the visible laser radiation in response to an opening of the housing and to control the turn off of the source of visible laser radiation in response to a closure of the housing.

2. Light-emitting device according to claim 1, wherein the source of the visible laser radiation emits a light with a wavelength of between 497 and 560 nm.

3. Light-emitting device according to claim 1, further comprising a controller to control a cyclical lighting of the source of the visible laser radiation source downstream from the switch.

4. Light-emitting device according to claim 1, wherein the source of the visible laser radiation has an outer cylindrical or conical surface of revolution and a predefined angular tolerance, and wherein the alignment component comprises:
- an outer part having an inner cylindrical or conical hole of revolution, an axis of the inner hole being offset in relation to a reference axis by a first angle at least equal to half of a predefined angular tolerance; and
- an intermediate part having an outer cylindrical or conical surface of revolution matching a portion of the inner hole of the outer part, and an inner cylindrical or conical hole of revolution matching a portion of an outer surface of the source of the visible laser radiation, an axis of the outer surface of revolution and an axis of the inner hole of the intermediate part forming an angle between them equal to the first angle.

5. Light-emitting device according to claim 1, wherein the source of invisible radiation has an outer cylindrical or conical surface of revolution and a predefined angular tolerance, and the alignment component comprises:
an outer part having an inner cylindrical or conical hole of revolution, an axis of the inner hole being offset in relation to a reference axis by a first angle at least equal to half of a predefined angular tolerance; and
an intermediate part having an outer cylindrical or conical surface of revolution matching a portion of the inner hole of the outer part, and an inner cylindrical or conical hole of revolution matching a portion of an outer surface of the source of invisible radiation, an axis of the outer surface of revolution and an axis of the inner hole of the intermediate part forming an angle between them equal to the first angle.

6. Light-emitting device of claim 1, wherein the source of the visible laser radiation has an outer cylindrical or conical surface of revolution and a predefined angular tolerance;
wherein the alignment component comprises an intermediate part and an outer part, the alignment component is configured to rotate the intermediate part within the outer part, the outer part has an inner cylindrical or conical hole of revolution, an axis of the inner hole being offset in relation to a reference axis by a first angle at least equal to half of a predefined angular tolerance;
wherein the intermediate part has an outer cylindrical or conical surface of revolution matching a portion of the inner hole of the outer part, and an inner cylindrical or conical hole of revolution matching a portion of an outer surface of the source of the visible laser radiation; and
wherein the alignment component is configured to rotate the source of visible laser radiation within the intermediate part, an axis of the outer surface of the source of the visible laser radiation and an axis of the inner hole of the intermediate part forms an angle between them equal to the first angle.

7. Smoke detection device comprising the light-emitting device according to claim 1; a receiver to receive a light emitted by the light-emitting device; and a signal generator to generate a signal representative of a detection of smoke and configured to emit a smoke detection signal in response to a reception of the light having a light intensity lower than a predefined limit value by the receiver.

8. Intrusion detection device comprising the light-emitting device according to claim 1; a receiver to receive a light emitted by the light-emitting device; and a signal generator to generate a signal representative of a detection of an intrusion and configured to emit an intrusion detection signal in response to a reception of the light having a light intensity lower than a predefined limit value by the receiver.

9. Method for manufacturing a light-emitting device for detecting passage or smoke in the emitted beam, comprising the steps of:
installing a source of invisible radiation of the light-emitting device on a flat mounting;
installing a source of visible laser radiation of the light-emitting device on the flat mounting
aligning optical axes of the radiation sources to be parallel by aligning a central axis of the visible laser radiation with a reference axis parallel to a central axis of the invisible radiation with an alignment component of the light-emitting device;
wherein the light-emitting device comprises a switch to turn off the source of the visible laser radiation;
controlling an activation of the source of the visible laser radiation in response to an opening of a housing, the housing houses the two radiation sources and the switch; and
controlling the turn off of the source of visible laser radiation in response to a closure of the housing.

10. Method according to claim 9, wherein the step of aligning further comprises the steps of:
rotating an inner part of the alignment component in an outer part of the alignment component comprising a cylindrical recess, an outer cylindrical surface of the inner part matches the cylindrical recess of the outer part, the inner part has a cylindrical recess with a circular base matching an outer surface of the source of visible laser radiation, axes of the inner and outer cylindrical surfaces of the inner part forms an angle between them greater than one angular degree and less than ten angular degrees; and
rotating the source of visible laser radiation within the inner part.

11. Method according to claim 9, wherein the source of the visible laser radiation has an outer cylindrical or conical surface of revolution and a predefined angular tolerance, wherein the step of aligning further comprises the steps of:
rotating an intermediate part of the alignment component within an outer part of the alignment component, the outer part has an inner cylindrical or conical hole of revolution, an axis of the inner hole being offset in relation to a reference axis by a first angle at least equal to half of a predefined angular tolerance, and the intermediate part has an outer cylindrical or conical surface of revolution matching a portion of the inner hole of the outer part; and
rotating the source of visible laser radiation within the intermediate part, the intermediate part has an inner cylindrical or conical hole of revolution matching a portion of an outer surface of the source of the visible laser radiation, an axis of the outer surface of the source of the visible laser radiation and an axis of the inner hole of the intermediate part forms an angle between them equal to the first angle.

* * * * *